United States Patent [19]

Matsumiya

[11] Patent Number: 5,628,547
[45] Date of Patent: May 13, 1997

[54] PASSENGER SEAT

[75] Inventor: James A. Matsumiya, Gerrards Cross, England

[73] Assignee: Britax Rumbold Limited, Warwick, England

[21] Appl. No.: 289,308

[22] Filed: Aug. 11, 1994

[30] Foreign Application Priority Data

Aug. 20, 1993 [GB] United Kingdom ............ 9317433
Nov. 4, 1993 [GB] United Kingdom ............ 9322760
Apr. 6, 1994 [GB] United Kingdom ............ 9406766

[51] Int. Cl.⁶ ............... B60N 2/24; B60N 2/20; B60N 2/34; A47C 1/022
[52] U.S. Cl. ............ 297/354.11; 297/316; 297/320; 297/342; 297/452.41; 297/180.1
[58] Field of Search .................... 297/316, 340, 297/354.11, 341, 342, 320, 180.1, 452.41

[56] References Cited

U.S. PATENT DOCUMENTS

| 233,140 | 10/1880 | Candrian | 297/316 |
|---|---|---|---|
| 3,072,436 | 1/1963 | Moore | 297/316 |
| 3,074,758 | 1/1963 | Schliephacke | 297/316 |
| 3,865,432 | 2/1975 | Rogers et al. | 297/316 |
| 5,058,954 | 10/1991 | Kan-Chee . | |
| 5,308,144 | 5/1994 | Korn . | |
| 5,460,427 | 10/1995 | Serber | 297/316 |
| 5,486,035 | 1/1996 | Koepke et al. | 297/340 |

FOREIGN PATENT DOCUMENTS

| 0399251 | 4/1990 | European Pat. Off. . | |
|---|---|---|---|
| 0523012 | 5/1992 | European Pat. Off. . | |
| 0196909 | 6/1965 | Switzerland | 297/354.11 |
| 2211084 | 6/1989 | United Kingdom . | |
| WO91/1275 | 9/1991 | WIPO . | |

*Primary Examiner*—Peter M. Cuomo
*Assistant Examiner*—Anthony D. Barfield
*Attorney, Agent, or Firm*—Davis and Bujold

[57] ABSTRACT

The seat pan of an aircraft passenger sleeper seat is mounted on a pivot axle for movement between a normal substantially horizontal position and a tilted position in which its front edge is lower than its rear edge. The seat back comprises a first portion which is mounted for angular movement between a substantially upright position and a reclined position, and a second portion mounted on a pivot axle for movement between an erect position in which it is substantially parallel to the first portion and a reclined position in which its upper edge is lower than when in its erect position. When the seat pan is tilted and the second portion of the seat back is reclined, their upper surfaces form a substantially plane support surface for a sleeping passenger.

14 Claims, 7 Drawing Sheets

PASSENGER SEAT

FIELD

This invention relates to a vehicle seat of the type having a seat back which can be lowered and is particularly, but not exclusively applicable to a seat of the type which also has a footrest which can be raised. Such seats are commonly known as sleeper seats and are used extensively as aircraft passenger seats.

RELATED ART

Many airlines use a pitch between successive rows of sleeper seats of about 62 inches (1575 mm). Consequently, it is not feasible to lower the seat back and raise the footrest of a sleeper seat sufficiently to form a continuous horizontal surface with the seat pan. With known sleeper seats, the maximum extent to which the seat back can be tilted is substantially above the horizontal. Similarly, the maximum extent to which the footrest can be raised is substantially below the horizontal. In this position, the seat back, seat pan and footrest form a zigzag surface which is fairly comfortable for people who sleep on their backs but is less comfortable for people who prefer to sleep on their sides. It is an object of the invention to provide a sleeper seat in which this disadvantage is reduced.

SUMMARY OF THE INVENTION

According to the invention, in one aspect, the seat pan of a vehicle seat of the type described above has a portion supported on mounting means which permit change of its orientation between a normal substantially horizontal position and a tilted position in which its front edge is lower than its rear edge.

The seat may have its seat pan mounted for angular movement about a horizontal axis between said normal substantially horizontal position and said tilted position.

According to the invention, in another aspect, the seat back of a vehicle seat of the type described above comprises a first portion which is mounted for angular movement between a substantially upright position and a reclined position, and a second portion having an outer surface supported on mounting means which permit change of its orientation between an erect position in which it is substantially parallel to the first portion and a reclined position in which its upper edge is lower than when in its erect position.

The second portion of the seat back may be pivotally mounted for angular movement about a transverse axis between said erect position and said reclined position.

The first portion of the seat back may be an outer portion, and the second portion may be a central portion which is coplanar with the outer portion when in its erect position and has its upper edge behind and below the adjacent part of the outer portion when in its reclined position.

Alternatively, the first portion of the seat back may be a substructure located behind the second portion which is mounted on such substructure for pivotal movement about an axis above the bottom of the seat back, preferably about half way between the top and the bottom thereof.

As a further alternative, the mounting means for the upper surface of the seat portion, the front surface of the second portion of the seat back, or both, may comprise a chamber having flexible side walls of non-uniform height and means for causing displacement of fluid into and out of said chamber. Two such chambers may be provided, one at each end of the seat portion or seat back, together with means for causing displacement of fluid between such chambers.

DETAILED DESCRIPTION OF THE PREFERRED EMBODIMENTS

Figure 1:
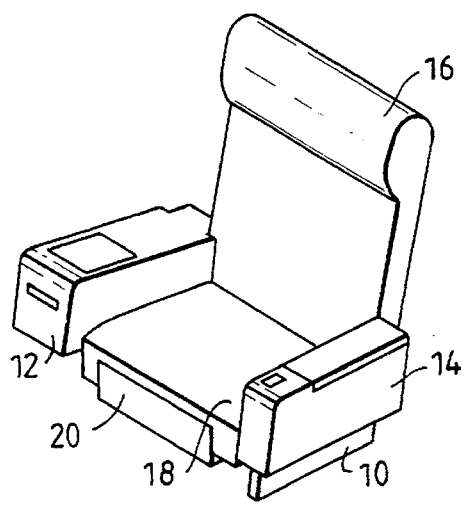
FIG. 1 is perspective view of a sleeper seat, in accordance with a first embodiment of the invention, in its upright position.
Figure 2:
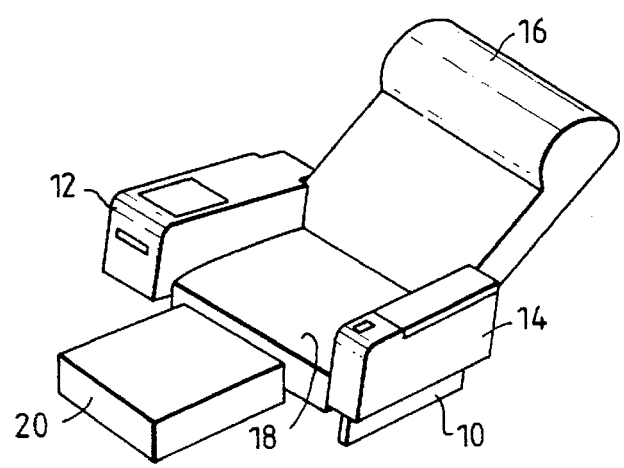
FIG. 2 is a perspective view of the sleeper seat shown in FIG. 1 with its footrest raised and its seat back inclined.

FIG. 1 shows a sleeper seat in accordance with the invention. The seat comprises a base frame 10, whereby it may be secured in place in an aircraft. Armrests 12 and 14 are rigidly secured to the frame 10. A seat back 16 is pivotally secured to the frame 10 for angular movement about a horizontal transverse axis near its bottom edge between an upright position as shown in FIG. 1 and a reclined position as shown in FIG. 2. A seat pan 18 is also mounted on the frame 10 and has, secured to its front edge, a legrest 20 which is movable between a stowed position, as shown in FIG. 1, and a deployed position, as shown in FIG. 2. As described so far, the seat shown in FIGS. 1 and 2 is similar to known sleeper seats.

Figure 3:
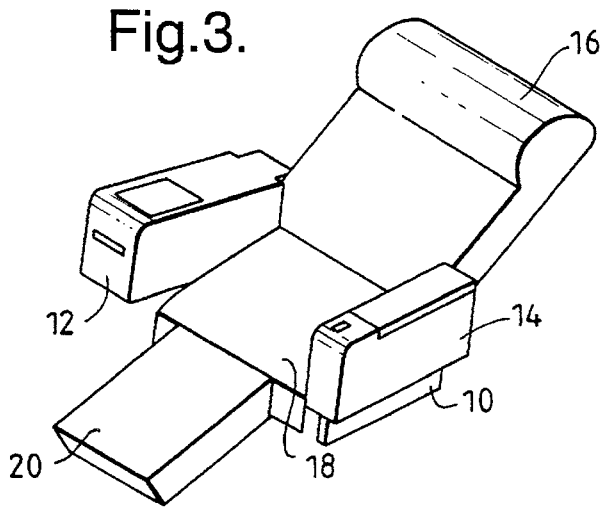
FIG. 3 is a perspective view of the seat shown in FIGS. 1 and 2 with its pan tilted.

In accordance with the invention, the seat pan 18 is pivotally mounted for angular movement about a transverse axis near its rear edge between a generally horizontal position, as shown in FIGS. 1 and 2, and an inclined position, as shown in FIG. 3, so that the seat back 16, the seat pan 18 and the legrest 20 all lie in the same inclined plane.

Instead of lowering the front edge of the seat pan 16, a similar result may be achieved by raising both the rear edge of the seat pan 18 and the bottom edge of the seat back 16.

Figure 4:
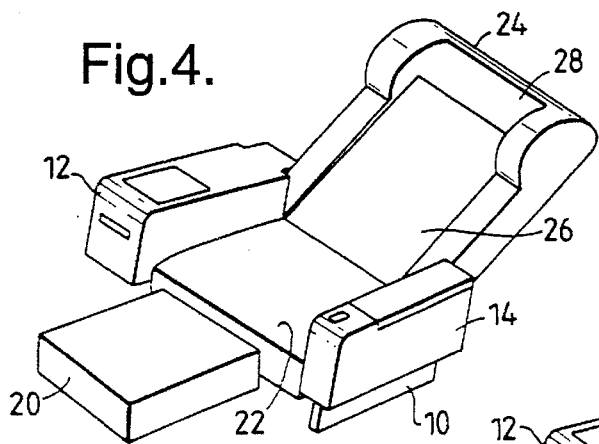
FIG. 4 is a perspective view of a sleeper seat in accordance with a second embodiment of the invention, with its footrest raised and its seat back inclined.
Figure 5:
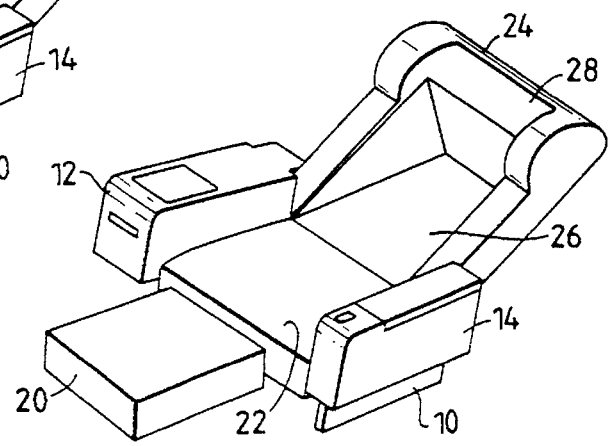
FIG. 5 is a perspective view of the embodiment shown in FIG. 4 with the central portion of its seat back further reclined.

FIGS. 4 and 5 illustrate a second embodiment of the invention having a frame 10, armrests 12 and 14 and a legrest 20 as described with reference to FIGS. 1 to 3. However, the seat pan 22 is immovably fixed to the frame 10 (as in known seats).

The seat back of the seat shown in FIGS. 4 and 5, consists of a U-shaped outer part 24 and a separate central part 26 disposed between the limbs of the U-shape. The outer part 24 is pivotally attached by the ends of its limbs to the frame 10 for angular movement between an upright position not shown and a reclined position, similar to the normal reclined position of known seats, as shown in FIG. 4.

The central part 26 of the seat back is pivotally mounted for angular movement about a transverse axis nears its bottom edge relative to the outer part 24 of the seat back between the position shown in FIG. 4, in which it is generally coplanar with the outer part, and a lowered position as shown in FIG. 5, in which its is more nearly coplanar with the seat pan 22. When in use in this position, the head of an occupant rests on the central zone 28 of the outer part 24 of the seat back, while the occupant's shoulder rests on the central part 26. The zone 28 thus serves as a pillow.

With this type of seat the thickness of the outer part 24 of the seat back provides the necessary structural strength. The central part 26 is thinner so that its bottom surface does not project below that of the outer part 24 when in the lowered position shown in FIG. 5 and thus does not interfere with the leg room of a vehicle seated behind the seat illustrated.

Figure 6:
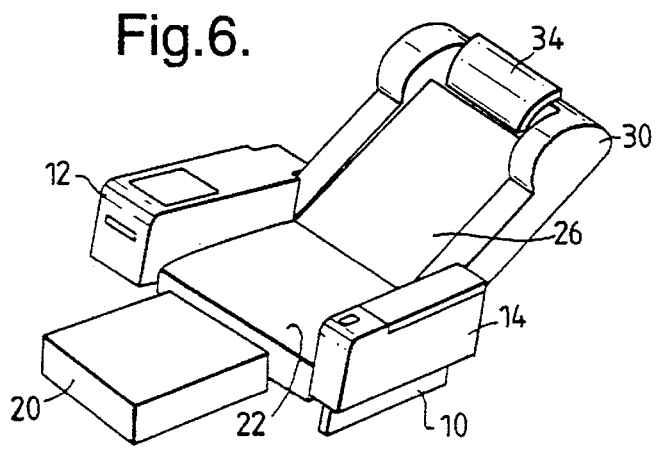
FIGS. 6 and 7 are perspective views, similar to FIGS. 4 and 5, of a third embodiment of the invention.
Figure 7:
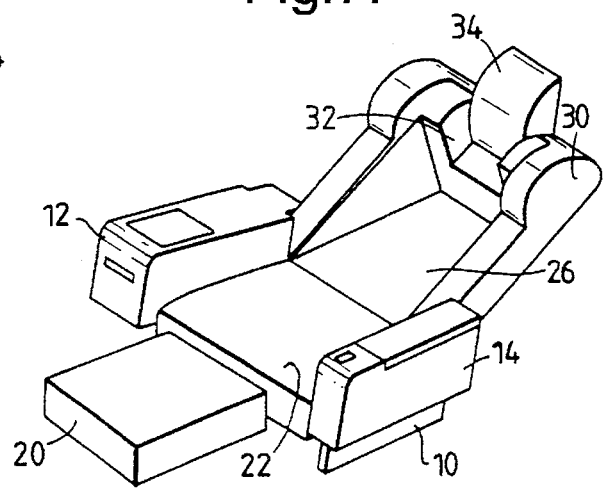

In some circumstances, the height of the zone 28 above the central part 26 (when the latter is in the position shown in FIG. 5) may be too great for the zone 28 to be comfortable for a pillow, particularly if it includes a padded headrest for use when the seat back is in its upright position. Referring to FIGS. 6 and 7, the outer part 30 of the seat back may include a central recess 32 in which a headrest 34 is slidably mounted. When the central part 26 of the seat back is pivoted down, as shown in FIG. 7, the headrest 34 slides away from the seat pan 22. A conventional pillow (not shown) can then be placed in the recess 32.

FIGS. 8 to 11 illustrate a further embodiment of the invention having a base frame 10 and armrests 12 and 14 similar to those previously. The seat has a seat back with an outer part 40 similar to the outer part 24 of the seat back shown in FIGS. 4 and 5. However, the inner part 42 of the seat back is pivotally mounted for angular movement about a transverse horizontal axle 44 located approximately half way between the upper and lower edges of the central part 42. The seat also has a seat pan 46 which is pivotally mounted on a horizontal transverse axle 48 located about halfway between the front edge and the rear edge of the seat pan 46. A footrest 50 is mounted on the front edge of the seat pan 46 in a similar manner to the footrest 20 of the previous embodiments.

Figure 8:
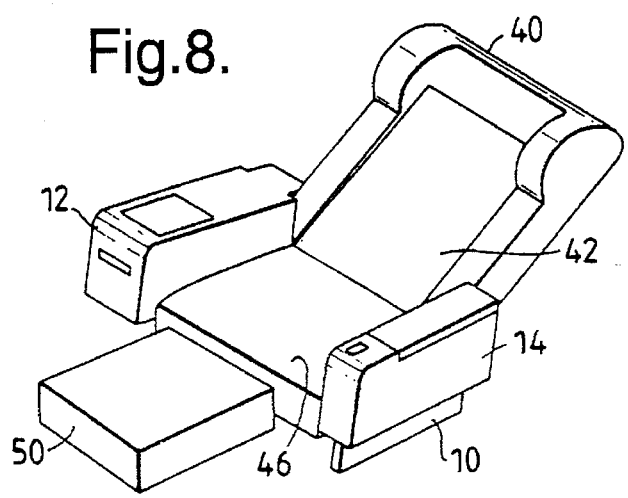
FIG. 8 is a perspective view, similar to FIG. 4, of a fourth embodiment of the invention.
Figure 9:
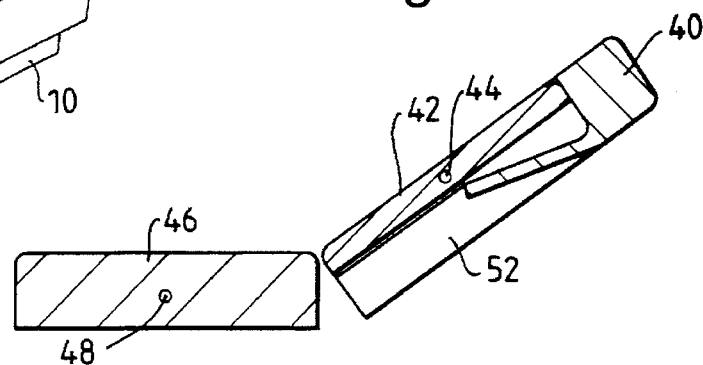
FIG. 9 is a longitudinal cross-sectional view of the embodiment shown in FIG. 8, with the footrest omitted.
Figure 10:
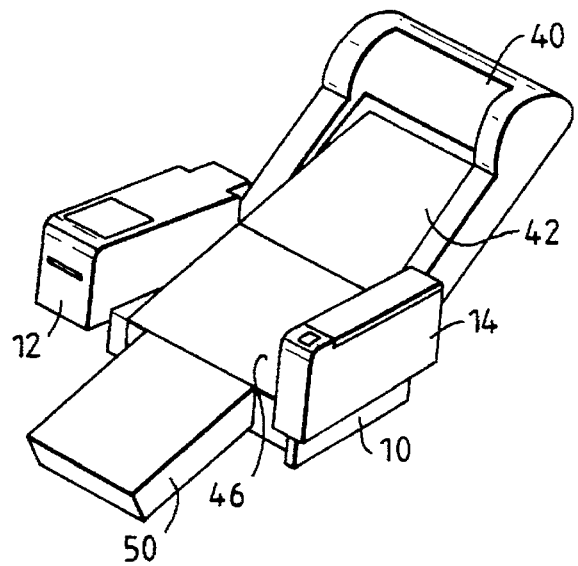
FIGS. 10 and 11 are views similar to FIGS. 8 and 9, of a fifth embodiment of the invention.
Figure 11:
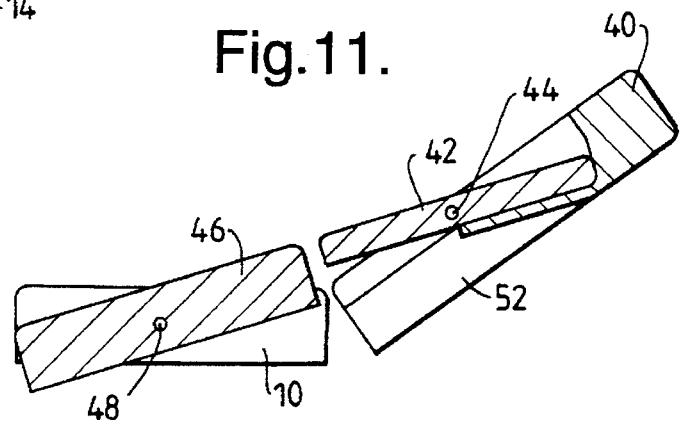

When the seat is to be used either in its upright or normal recline position, the seat pan 46 is pivoted to a substantially horizontal position and the central portion 42 of the seat back pivoted so as to lie parallel to the outer portion thereof, as shown in FIGS. 8 and 9. When the occupant of the seat wishes to sleep, the central part 42 of the seat back is pivoted so as to raise its bottom edge and the seat pan 46 is pivoted so as to raise its rear edge as illustrated in FIGS. 10 and 11. As can be seen in FIGS. 9 and 11, the outer part 40 includes a central opening 52 behind the lower part of the pivoting central portion 42 which allows the outer part 40 of the seat back to be pivoted considerably lower than would otherwise be the case before it encroaches on the foot space of a sleeping occupant of a seat behind the seat illustrated.

In all of the embodiments described above, the seat back, the seat pan and the legrest can be oriented so that they all lie in the same inclined plane. The invention also includes seats of the above type in which there is always a non-zero angle between the seat pan 18 and the seat back 16 and/or between the seat pan 18 and the legrest 20.

Figure 12:
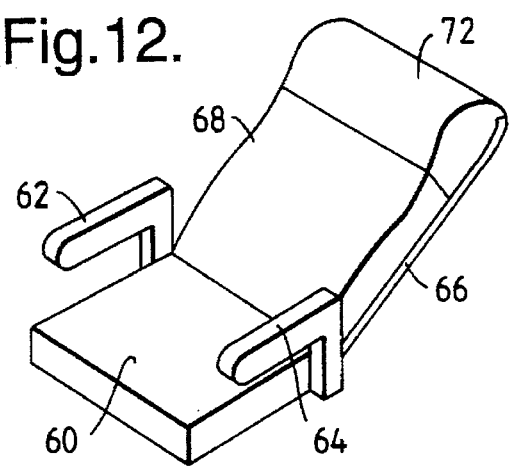
FIG. 12 is a perspective view of a tourist class seat in accordance with the invention with its seat back reclined in a conventional manner.
Figure 13:
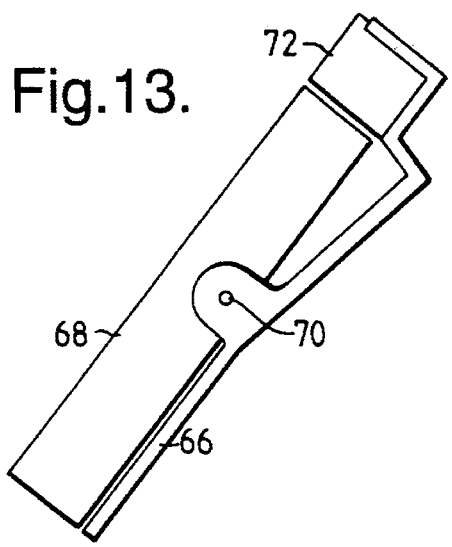
FIG. 13 is a side view of the seat back of the seat shown in FIG. 12.

FIGS. 12 and 13 show a tourist class seat in accordance with the invention. The seat comprises a seat pan 60 which is secured to a conventional support frame (not shown) whereby adjacent seats may be mounted in a row. The seat has a pair of armrests 62 and 64, and a seat back subframe 66 which is pivotally mounted for angular movement relative to the seat pan 60 about an axis adjacent to the rear edge of the seat pan 60. As can be seen from FIG. 13, the subframe 66 has a seat-back cushion 68 pivotally mounted thereon for angular movement about a transverse axis 70 located approximately halfway between its upper and lower edges (in a similar manner to the seat back of the seat shown in FIGS. 8 to 11). The subframe 66 also carries a headrest 72 above the top edge of the seat back cushion 68. As can be seen from FIGS. 14 and 15, the back cushion 68 can be pivoted to a position in which it is further reclined relative to the subframe 66.

Figure 14:
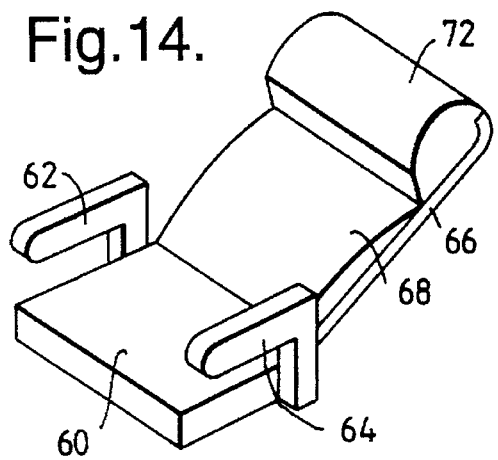
FIG. 14 is a perspective view of the seat shown in FIG. 12 but with its seat back further inclined in accordance with the invention.
Figure 15:
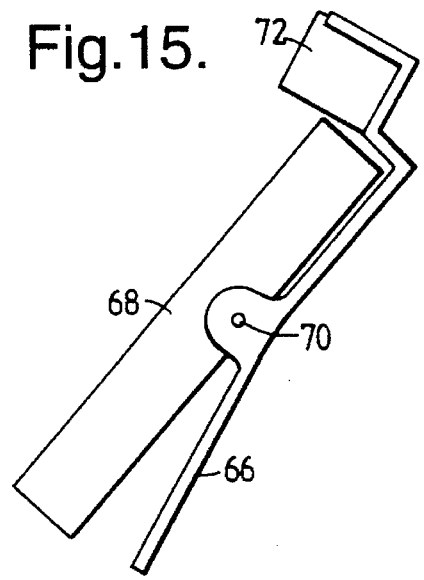
FIG. 15 is a side view of the seat back shown in FIG. 14.
Figure 16:
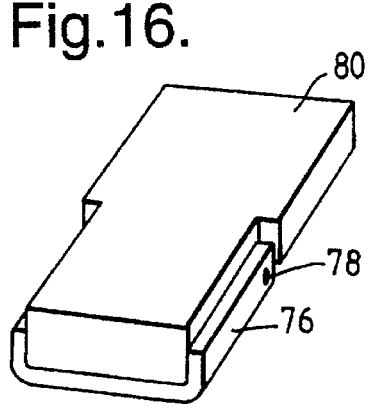
FIG. 16 is a perspective view of an alternative form of seat back in accordance with the invention in a normal reclined position.
Figure 17:
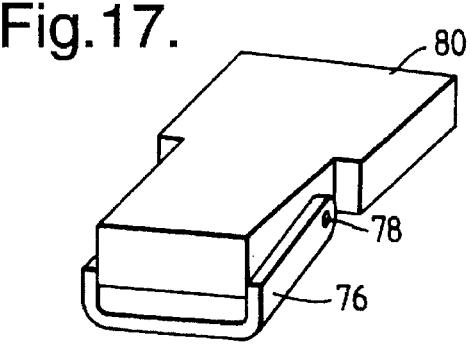
FIG. 17 is a perspective view of the seat back shown in FIG. 16 in a position in which it has been further reclined in accordance with the invention.

FIGS. 16 and 17 show an alternative seat back which can be used with the seat shown in FIGS. 12 and 14. This alternative seat back has a subframe 76 which extends only halfway up the seat back and which has an axle 78 at its upper end on which a seat cushion 80 is pivotally mounted.

Figure 18:
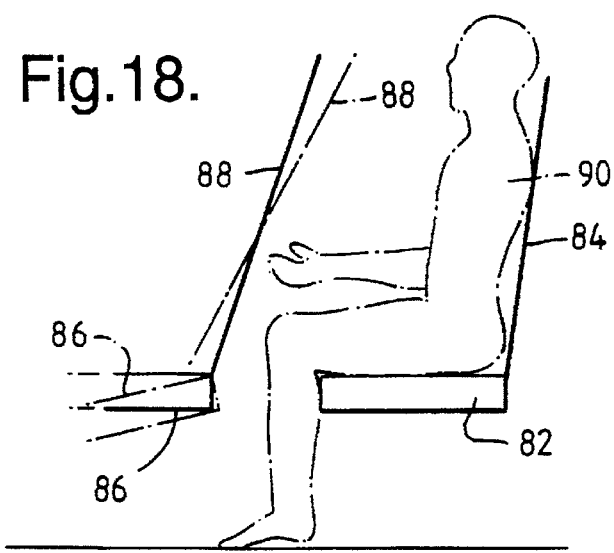
FIG. 18 is a schematic side view of two aircraft seats, one behind the other, both having seat pans of the type illustrated in FIG. 11 and seat backs of the type illustrated in FIGS. 16 and 17, with the rearmost seat in its upper position.
Figure 19:
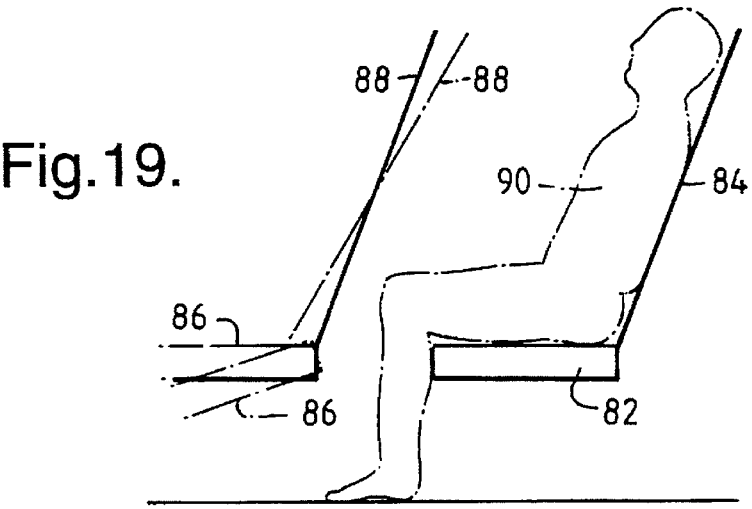
FIG. 19 is a schematic view, similar to FIG. 18 but with the rearmost seat in a normal reclined position.
Figure 20:
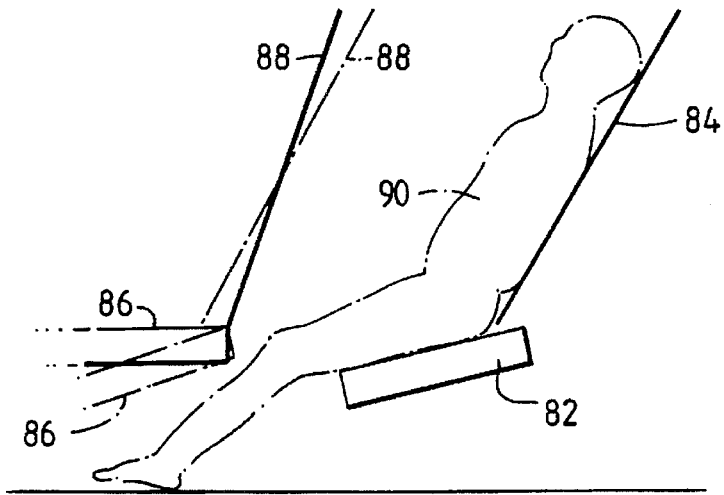
FIG. 20 is a schematic view, similar to FIGS. 18 and 19 but with the rearmost seat in a fully reclined position.

FIGS. 18 to 20 show a pair of seats, one behind the other, each having a seat back as illustrated in FIGS. 16 and 17. In FIG. 18, the rearward seat is shown with its seat pan 82 in a horizontal position and its seat back 84 in an upright position. The seat immediately in front is shown in solid lines with its seat pan 86 horizontal and its seat back 88 in a normal reclined position, in which it is parallel to its subframe 76 (not shown in FIG. 18). FIG. 18 also shows, in chain-dotted lines, the seat pan 86 tilted downwards about a horizontal axis adjacent to its rear edge and the seat back 88 in a fully reclined position in which it is pivoted relative to its subframe 76. In neither position does the seat back 88 interfere with the knees of an occupant 90 of the rearward seat 82, 84.

Turning to FIG. 19, when the seat back 84 is reclined to its normal position, equivalent to the position of the seat back 88 shown in solid lines, the knees of the seated occupant 90 are still clear of the seat back 88 of the seat in front. When the seat pan 82 is tilted and the seat back 84 fully reclined, to positions equivalent to those of the seat pan 86 and the seat back 88 shown in chain-dotted lines, the legs of the seated occupant 10 can fit under the seat pan 86 of the seat in front even when in its tilted position shown in chain-dotted lines.

In all of the above embodiments of the invention, conventional manually releasable clutches are provided to hold the various parts of the seats in chosen positions relative to one another. Alternatively the relative positions of the various parts of the seats maybe adjusted using electric, hydraulic or pneumatic motors.

Figure 21:
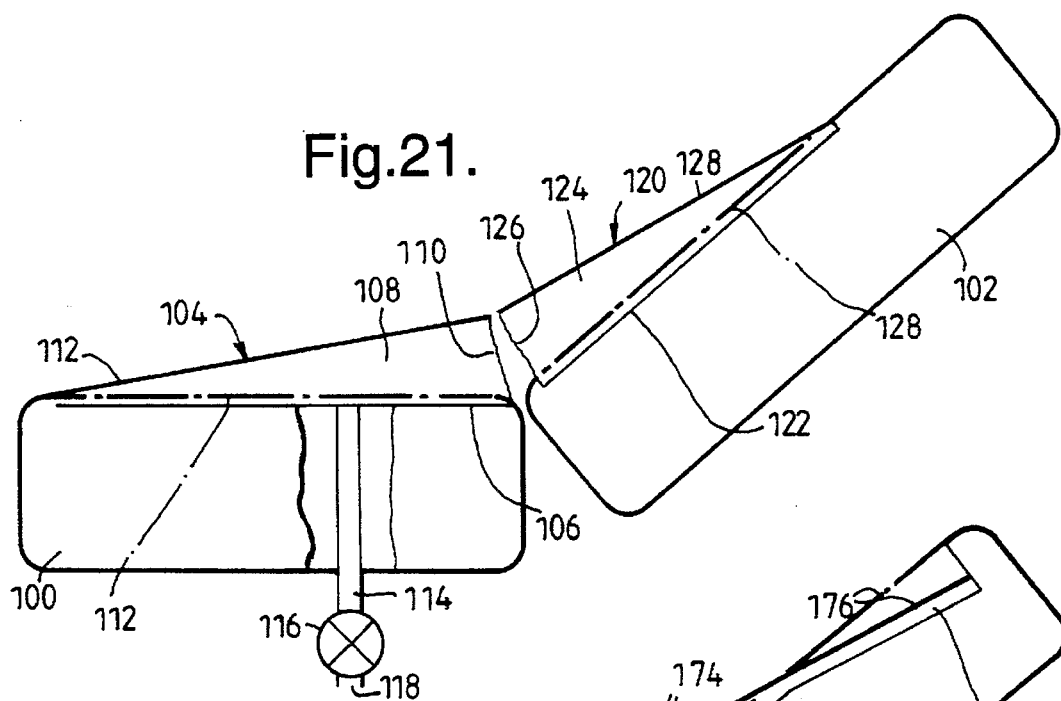
FIG. 21 is a schematic view of a seat in accordance with an embodiment of the invention, employing adjustment by displacement of fluid, with its seat back reclined.

FIG. 21 shows a sleeper seat having a seat pan 100 and a seat back 102, the latter being illustrated in its reclined position. A fluid chamber 104 has a bottom wall formed by the top surface 106 of the seat pan 100, triangular flexible side walls 108, a bellows-like rear wall 110, and an outer wall 112 which is flexibly connected to the seat pan 100 along its front edge.

A duct 114 leads through the seat pan 100 to a reversible pump 116, which serves to pump fluid into and out of the chamber 104. The fluid may be air, in which case the duct end 116 may be open to the atmosphere. Alternatively, it may be connected to a reservoir (not shown).

A similar fluid chamber 120 has an inner wall formed by the front surface 122 of the seat back 102, triangular flexible side walls 124 a bellows-like bottom wall 126, and an outer wall 128 which is flexibly connected to the seat pan 100 along its front edge. A pump (not shown), similar to the pump 116, serves to pump fluid into and out of the chamber 120.

When the chambers 104 and 120 are filled with fluid, the outer walls 112 and 128 are at a relatively large obtuse angle to one another, as shown in solid lines, significantly reducing the angle between the seat pan 100 and the seat back 102. When substantially all fluid is removed from the chambers 104 and 120, the outer walls 112 and 128 are substantially parallel to the seat pan 100 and the seat back 102 respectively, as shown in chain-dotted lines, and the seat back 102 is ready to be returned to its upright position.

Figure 22:
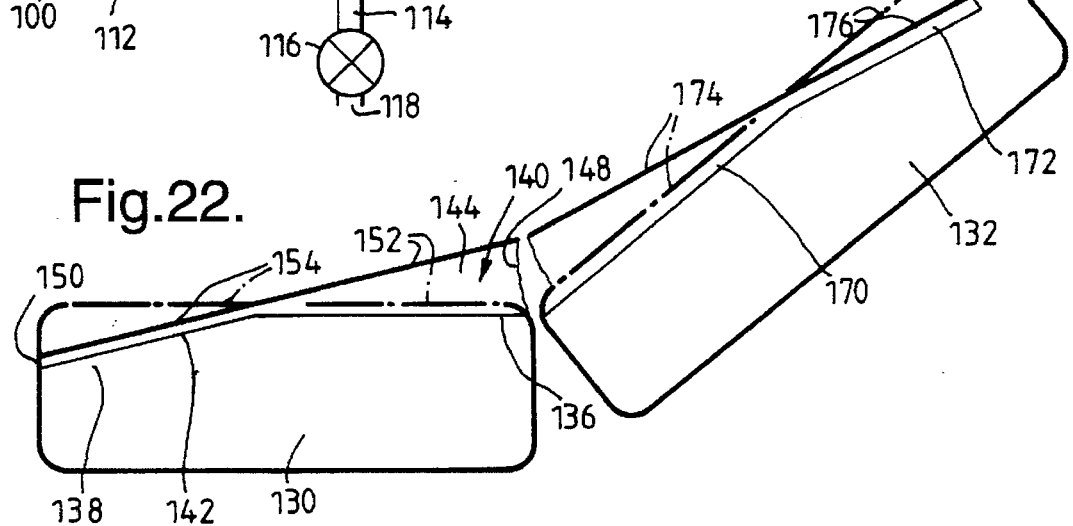
FIG. 22 is a schematic view of a seat in accordance with another embodiment of the invention, employing adjustment by displacement of fluid, with its seat back reclined.
Figures 23, 24:
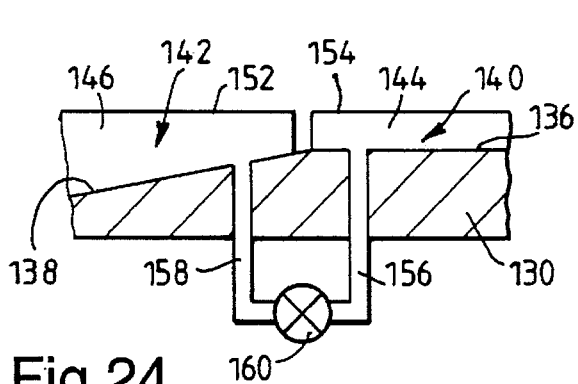
FIG. 23 is a schematic sectional view of part of the seat pan of the seat shown in FIG. 22, with its top surface tilted.
FIG. 24 is a schematic sectional view of part of the seat pan of the seat shown in FIG. 22, with its top surface horizontal.

FIGS. 22 to 24 show an alternative fluid-operated sleeper seat having a seat pan 130 and a seat back 132, the latter being illustrated in its reclined position. The top surface of the seat pan 130 has a substantially horizontal rear part 136 and a sloping front part 138 with its front edge lower than its rear edge. The two top surface parts 136 and 138 form the bottom walls of respective fluid chambers 140 and 142, each of which also has triangular flexible side walls 144, 146, bellows-like end wall 148, 150, and outer walls 152, 154 which are flexibly connected to the seat pan 130 along its rear edge and its front edge respectively.

Respective ducts 156, 158 lead through the seat pan 100 from each chamber 140, 142 to respective ports of a reversible pump 160, which serves to pump fluid from one of the chambers 140, 142 to the other. The fluid is preferably a liquid so as to be relatively incompressible. Pumping the fluid into the rear chamber 140 tilts the outer walls 152 and 154 to the position shown FIG. 23 (and in solid lines in FIG. 22). Pumping the fluid into the front chamber 142 tilts the outer walls 152 and 154 to the position shown FIG. 23 (and in solid lines in FIG. 22).

Two similar chambers 170 and 172 are formed on the front surface of the seat back 132. The outer walls 174, 176 thereof are tilted between the orientation shown in solid lines in FIG. 22 and the orientation shown in chain-dotted lines by pumping fluid between the two chambers 170 and 172.

The seat illustrated in FIGS. 22 to 24 may be simplified by replacing the pump 160 with a valve which is preferably spring-biassed into its closed position. When such valve is open, fluid can be displaced out of either of the chambers 140 and 142 and into the other chamber by pressing down on the outer wall 152,154 of the chamber out of which fluid is to be displaced. The pump (not shown) connected between the chambers 170 and 172 of the seat back 132 may be replaced by a similar valve.

In FIGS. 21 to 24, the outer walls 112, 128, 152, 154, 174, 176 of the fluid chambers are shown as the outer surfaces of the seat. If desired, conventional upholstered cushions may be positioned on top of these outer walls.

Figure 25:
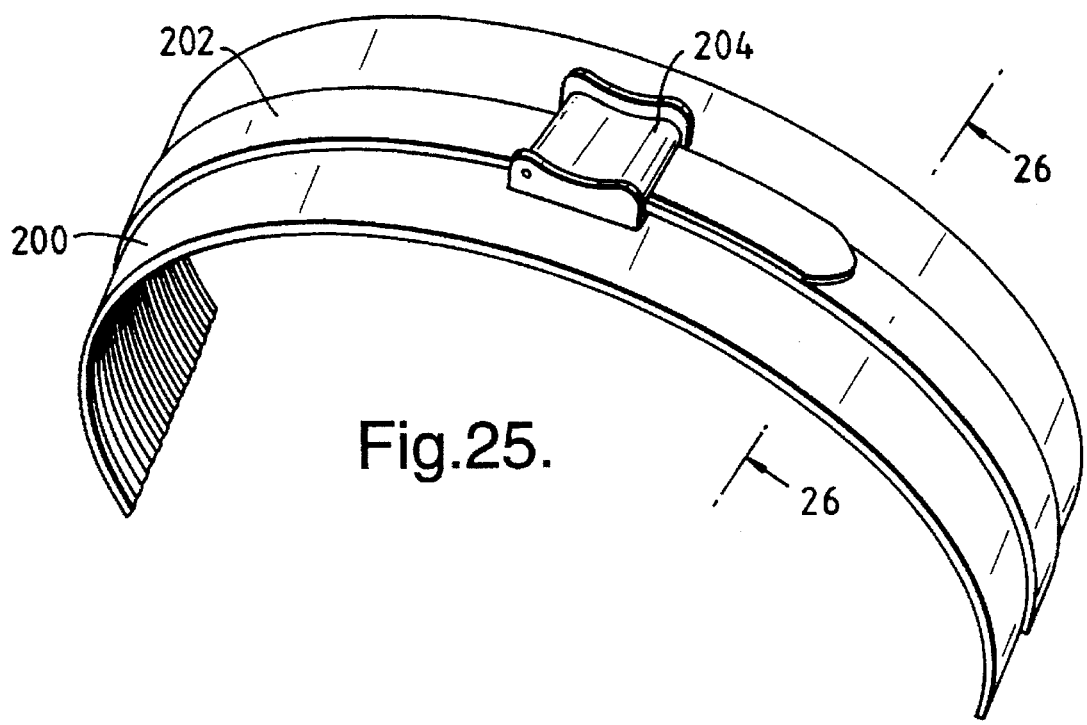
FIG. 25 is a scrap perspective view of a belt for use with any of the embodiments of the invention.
Figure 26:
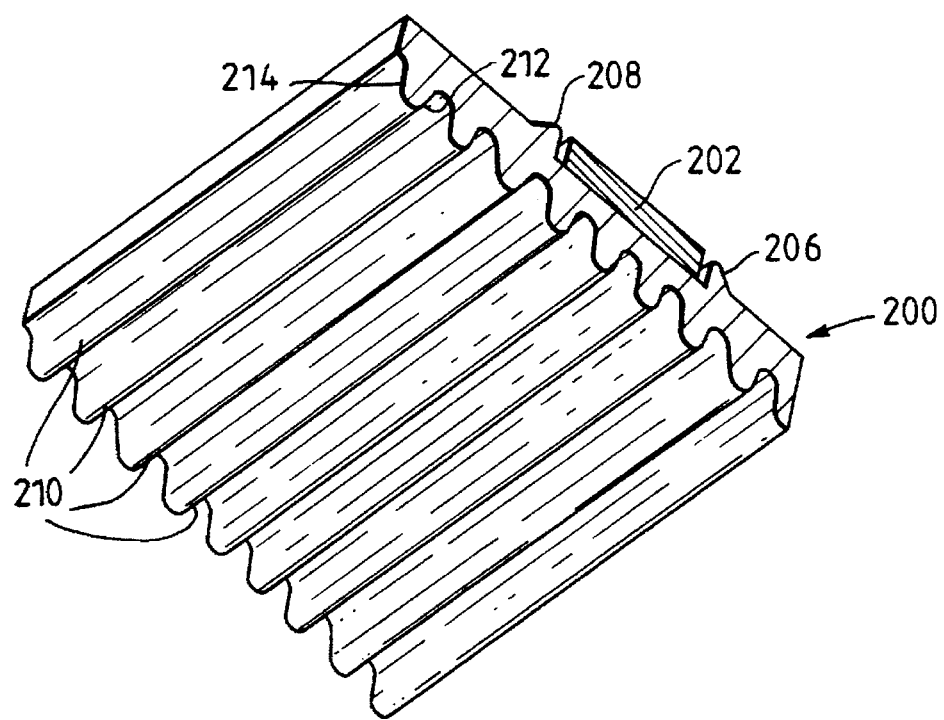
FIG. 26 is a cross-sectional view taken on the line 26—26 in FIG. 25.

When sleeping on a surface which slopes from head to foot there is a risk of a seat occupant tending to slip or wiggle down the slope while asleep. Referring to FIGS. 25 and 26, the risk of this can be reduced by fitting an auxiliary pad 200 between the occupant and a standard aircraft seat belt 202 which is fastened by a buckle 204. As can best be seen in FIG. 22, the pad 200 has two ribs 206 and 208 on its outer surface, between which the seat belt 202 is received. On its inner surface, the pad 200 has a row of longitudinally extending ribs 210, each of which has a substantially vertical face 212 facing the occupants's head and a sloping face 214 facing the occupant's seat. With this arrangement, there is greater resistance to downward movement of the occupant's body than to upward movement. Because the ribs run along the length of the belt, there is relatively little resistance to body rotation.

Although the invention is particularly applicable to aircraft passenger seats, it may also be applied to seats for land, marine and amphibious vehicles.

I claim:

1. A vehicle seat comprising:

a base frame;

a seat pan having an upper surface with a front edge and a rear edge;

seat pan mounting means for supporting the seat pan on the base frame and for permitting change of the orientation of the upper surface of the seat pan between a normal substantially horizontal position and a tilted position in which the front edge of the seat pan is lower than the rear edge of the seat pan;

a seat back having a first portion and a second portion, the first portion being mounted on the base frame for angular movement between a substantially upright position and a reclined position without changing the orientation of the seat pan, the second portion having an outer surface supported on the first portion by second portion mounting means which permits change of the orientation of the outer surface between:

i) an erect position, in which the outer surface of the second portion is substantially parallel to the first portion, and ii) a reclined position, in which the outer surface of the second portion is substantially coplanar with the upper surface of the seat pan, when the first portion is in the reclined position and the seat pan is in the tilted position.

2. A vehicle seat according to claim 1, wherein the seat pan is mounted for angular movement about a horizontal axis between said normal substantially horizontal position and said tilted position.

3. A vehicle seat according to claim 2, wherein said horizontal axis is at an intermediate position between the front and rear edges of the seat pan.

4. A vehicle seat according to claim 2, wherein said horizontal axis is adjacent to the rear edge of the seat pan.

5. A vehicle seat according to claim 2, wherein said horizontal axis is adjacent to the front edge of the seat pan.

6. A vehicle seat according to claim 1, wherein the second portion of the seat back is pivotally mounted for angular movement about a transverse axis between said erect position and said reclined position.

7. A vehicle seat according to claim 1, wherein the first portion of the seat back comprises an outer portion, and the second portion comprises a central portion which is coplanar with the outer portion when the central portion is in the erect position, and has an upper edge located behind and below an adjacent part of the outer portion when the central portion is in the reclined position.

8. A vehicle seat according to claim 1, wherein the first portion of the seat back comprises an upper portion, and the second portion of the seat back comprises a lower portion which is coplanar with the upper portion when the lower portion is in the erect position, and has an upper edge located behind and below a lower edge of the upper portion when the lower portion is in the reclined position.

9. A vehicle seat according to claim 1, wherein the first portion of the seat back comprises a substructure located behind the second portion of the seat back which is mounted on said substructure for pivotal movement about an axis above a bottom of the second portion.

10. A vehicle seat according to claim 9, wherein said axis is at substantially equal distances from a top and the bottom of the second portion.

11. A vehicle seat according to claim 1, wherein the second portion of the seat back comprises a back chamber having means for displacing fluid into and out of said back chamber, said back chamber being defined by:

i) an inner wall, ii) flexible side walls of non-uniform height connected to said inner wall, and iii) an outer wall connected to said side walls.

12. A vehicle seat according to claim 11 wherein the second portion of the seat back comprises two back chambers, one at each end of the seat back, and means for displacing fluid between said back chambers.

13. A vehicle seat according to claim 1, wherein the seat pan mounting means comprises a seat chamber defined by a bottom wall, flexible side walls of non-uniform height connected to the bottom wall, and an outer wall connected to the side walls; and means for displacing fluid into and out of said chamber.

14. A vehicle seat according to claim 15, wherein the seat pan mounting means comprises two seat chambers, one at each end of the seat pan, and means for displacing fluid between said seat chambers.

* * * * *